(12) United States Patent
Bolger et al.

(10) Patent No.: US 9,464,601 B2
(45) Date of Patent: Oct. 11, 2016

(54) METHOD AND SYSTEM FOR ADJUSTING A FUEL TANK ISOLATION VALVE

(71) Applicant: Ford Global Technologies, LLC, Dearborn, MI (US)

(72) Inventors: Bryan Bolger, Canton, MI (US); Michael Paul Lindlbauer, Canton, MI (US); Mark W. Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 398 days.

(21) Appl. No.: 14/073,750

(22) Filed: Nov. 6, 2013

(65) Prior Publication Data

US 2015/0122228 A1 May 7, 2015

(51) Int. Cl.
   F02M 25/08  (2006.01)
   F02D 41/22  (2006.01)
   F02D 41/00  (2006.01)
   F02D 29/02  (2006.01)

(52) U.S. Cl.
   CPC ........ *F02M 25/0836* (2013.01); *F02D 41/004* (2013.01); *F02D 41/221* (2013.01); *F02M 25/0818* (2013.01); *F02D 29/02* (2013.01); *F02D 2041/224* (2013.01); *F02D 2041/228* (2013.01); *Y02T 10/40* (2013.01); *Y10T 137/0318* (2015.04)

(58) Field of Classification Search
   CPC .................... F02M 25/0836; F02M 25/0818; F02D 41/004; F02D 2041/224; F02D 29/02; F02D 2041/228; F02D 41/221

USPC .................................................. 123/518–521
See application file for complete search history.

(56) References Cited

U.S. PATENT DOCUMENTS

| | | | |
|---|---|---|---|
| 6,283,147 B1 | 9/2001 | Rosseel | |
| 6,761,154 B2 * | 7/2004 | Takagi | ............... F02M 25/0818 123/198 D |
| 7,654,403 B2 | 2/2010 | DeCapua et al. | |
| 8,019,525 B2 | 9/2011 | DeBastos et al. | |
| 8,434,461 B2 | 5/2013 | Kerns et al. | |
| 2006/0144241 A1 | 7/2006 | Fukagawa et al. | |

(Continued)

FOREIGN PATENT DOCUMENTS

| | | |
|---|---|---|
| CA | 2564479 A1 | 11/2005 |
| WO | 2004071635 A1 | 8/2004 |

OTHER PUBLICATIONS

Pearce, Russell R. et al., "Method and System for Fuel Vapor Control," U.S. Appl. No. 14/034,424, filed Sep. 23, 2013, 38 pages.

(Continued)

*Primary Examiner* — Hung Q Nguyen
*Assistant Examiner* — Xiao Mo
(74) *Attorney, Agent, or Firm* — David Kelley; Alleman Hall McCoy Russell & Tuttle LLP

(57) ABSTRACT

Methods and systems are provided for adjusting and diagnosing a position of a fuel tank isolation valve of a fuel system. In one example, a method may include adjusting the fuel tank isolation valve via electrical pulses and tracking a position of the FTIV by counting each of the electrical pulses. When a vacuum is created in the fuel system, the method may include verifying the position of the FTIV based on resulting fuel system pressures.

20 Claims, 5 Drawing Sheets

(56) References Cited

U.S. PATENT DOCUMENTS

| | | | |
|---|---|---|---|
| 2011/0166765 | A1 | 7/2011 | DeBastos et al. |
| 2012/0031499 | A1* | 2/2012 | Scott ............... F16K 31/046 137/14 |
| 2012/0211087 | A1 | 8/2012 | Dudar et al. |

OTHER PUBLICATIONS

Delaire, G. et al., "Mathematical Modeling of a Balanced Canister Purge Solenoid Valve," SAE Technical Paper Series No. 1999-1-1080, International Congress and Exposition, Detroit, MI., Mar. 1-4, 1999, 21 pages.

Anonymous, "Method to Minimize Hydrocarbon Emissions in a PHEV Vehicle," IPCOM No. 000229408, Published Jul. 26, 2013, 2 pages.

Anonymous, "Energy Efficient ELCM EVAP Monitor for PHEV Vehicles," IPCOM No. 000233164, Published Nov. 27, 2013, 2 pages.

Anonymous, "A Method to Reduce EVAP Bleed Emissions in HEV Vehicles," IPCOM No. 000237774, Published Jul. 10, 2014, 2 pages.

Anonymous, "Method to reduce fuel volatility in PHEV vehicles to improve Evap monitor robustness and emissions," IPCOM No. 000238130D, Published Aug. 4, 2014, 2 pages.

Anonymous, "A Carbon Canister Integrity Diagnostic for PHEV Using Diurnal Temperature Cycle," IPCOM No. 000240457, Published Jan. 30, 2015, 2 pages.

Anonymous, "A Method to Eliminate Passive Valves in NIRCOS Sealed Tanks," IPCOM No. 000240487, Published Feb. 3, 2015, 2 pages.

Anonymous, "An Onboard Method to Mitigate Very Small Evap Leaks in Start/Stop and HEV Vehicles," IPCOM No. 000240776, Published Feb. 27, 2015, 2 pages.

Anonymous, "A Method to Perform Offboard Purging for PHEV Vehicles," IPCOM No. 000241418, Published Apr. 24, 2015, 2 pages.

Anonymous, "A Carbon Canister Integrity Diagnostic for HEV Using ELCM Pump," IPCOM No. 000238913, Published Sep. 24, 2014, 2 pages.

\* cited by examiner

METHOD AND SYSTEM FOR ADJUSTING A FUEL TANK ISOLATION VALVE

BACKGROUND/SUMMARY

Vehicle emission control systems may be configured to store fuel vapors from fuel tank refueling and diurnal engine operations, and then purge the stored vapors during a subsequent engine operation. In hybrid vehicles, shorter engine operation times can lead to insufficient purging of fuel vapors from the vehicle's emission control system. To address this issue, hybrid vehicles may include a fuel tank isolation valve (FTIV) between a fuel tank and a hydrocarbon canister of the emission system to limit the amount of fuel vapors absorbed in the canister. In some examples, the FTIV may be a bi-stable valve adjustable between open and closed positions via a short electrical pulse. However, a position of the FTIV during use may not be known without an additional sensor. As a result, the FTIV may be adjusted into a different position than desired during operation.

One example approach of a bi-stable isolation valve is shown by Takagi et al. in U.S. Pat. No. 6,761,154. Therein, an electromagnetically actuated open/close valve is shown in a vapor passage between a fuel tank and a fuel canister. The valve is opened and closed under different engine operating conditions; however, there may not be a way of diagnosing a position of the valve.

As one example, the issues described above may be addressed by a method for adjusting a fuel tank isolation valve (FTIV) of a fuel system by sending electrical pulses to the FTIV, counting each of the electrical pulses to track a position of the FTIV, and verifying the position of the FTIV when a vacuum is created in the fuel system. In this way, the position of the FTIV may be diagnosed, thereby resulting in increased accuracy of subsequent valve control.

For example, when a vacuum (e.g., fuel system pressure below a vacuum threshold pressure) is sensed in the fuel system, the FTIV must be closed otherwise the vacuum may not be achieved. Thus, verifying the position of the FTIV may include verifying the FTIV is closed when a vacuum is sensed in the fuel system. Additionally or alternatively, the FTIV may be verified as closed responsive to a fuel tank pressure greater than a threshold pressure. A vacuum may be applied to the fuel system in response to the position of the FTIV being unknown, a duration since last diagnosing the FTIV position, and/or a request to run a leak check routine in the fuel system. In one example, a controller may operate a vacuum pump of an evaporative leak check module (ELCM) in order to apply the vacuum to the fuel system. If no vacuum is sensed after applying the vacuum to the fuel system, the controller may determine the FTIV is open.

After diagnosing the position of the FTIV, the controller may adjust the FTIV into a desired position. In one example, adjusting the FTIV to the desired position includes sending an electrical pulse to actuate the FTIV from a first position to the desired position. In another example, adjusting the FTIV to the desired position may include not sending the electrical pulse to actuate the FTIV when the FTIV is already in the desired position. In some examples, degradation of the FTIV may also be determined if the FTIV is verified as being open when it is supposed to be closed. Thus, as a result of applying a vacuum to the fuel system, the position of the FTIV may be determined and used for subsequent valve control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
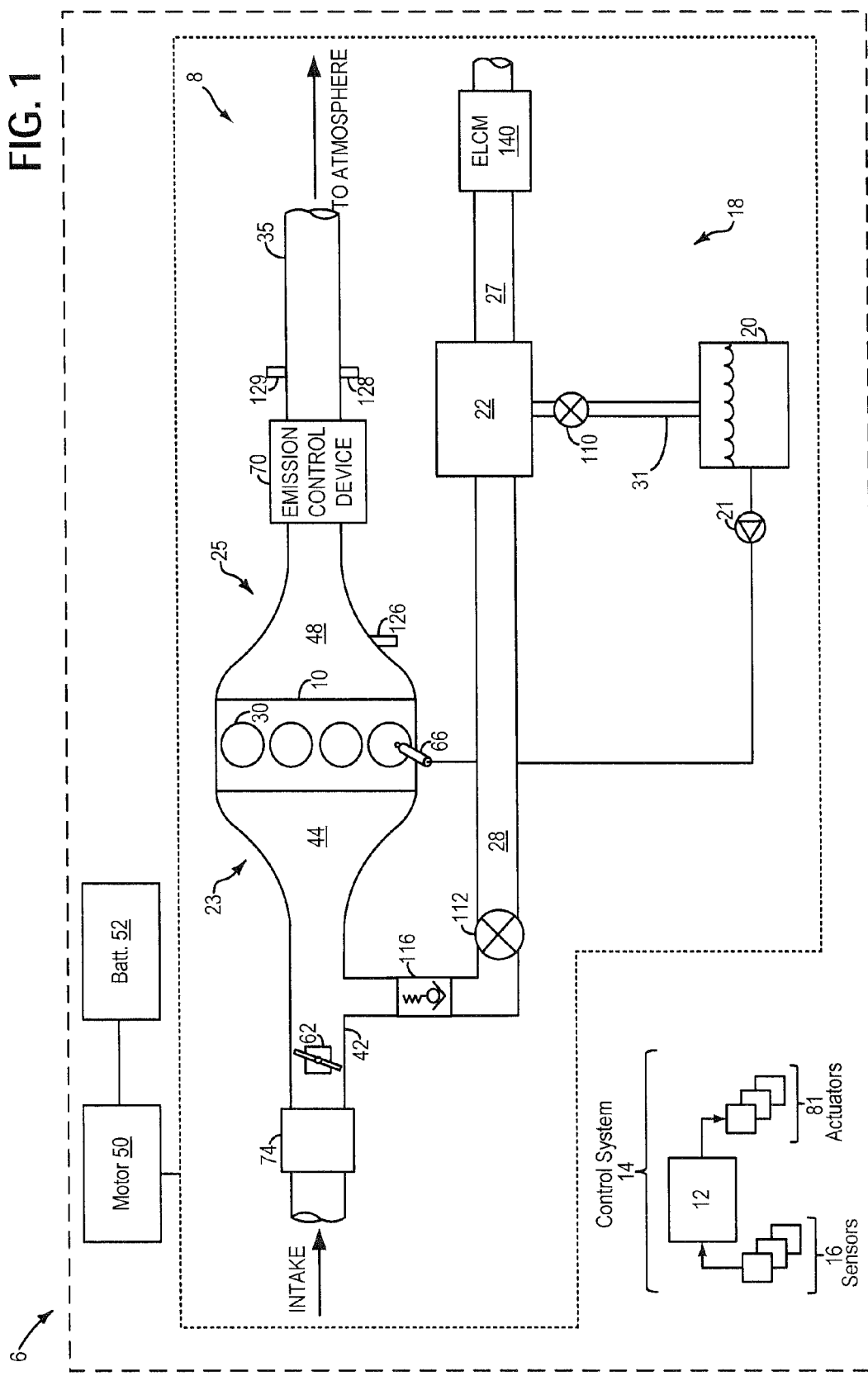
FIG. 1 shows a schematic depiction of an example fuel system of a vehicle.
Figure 2:
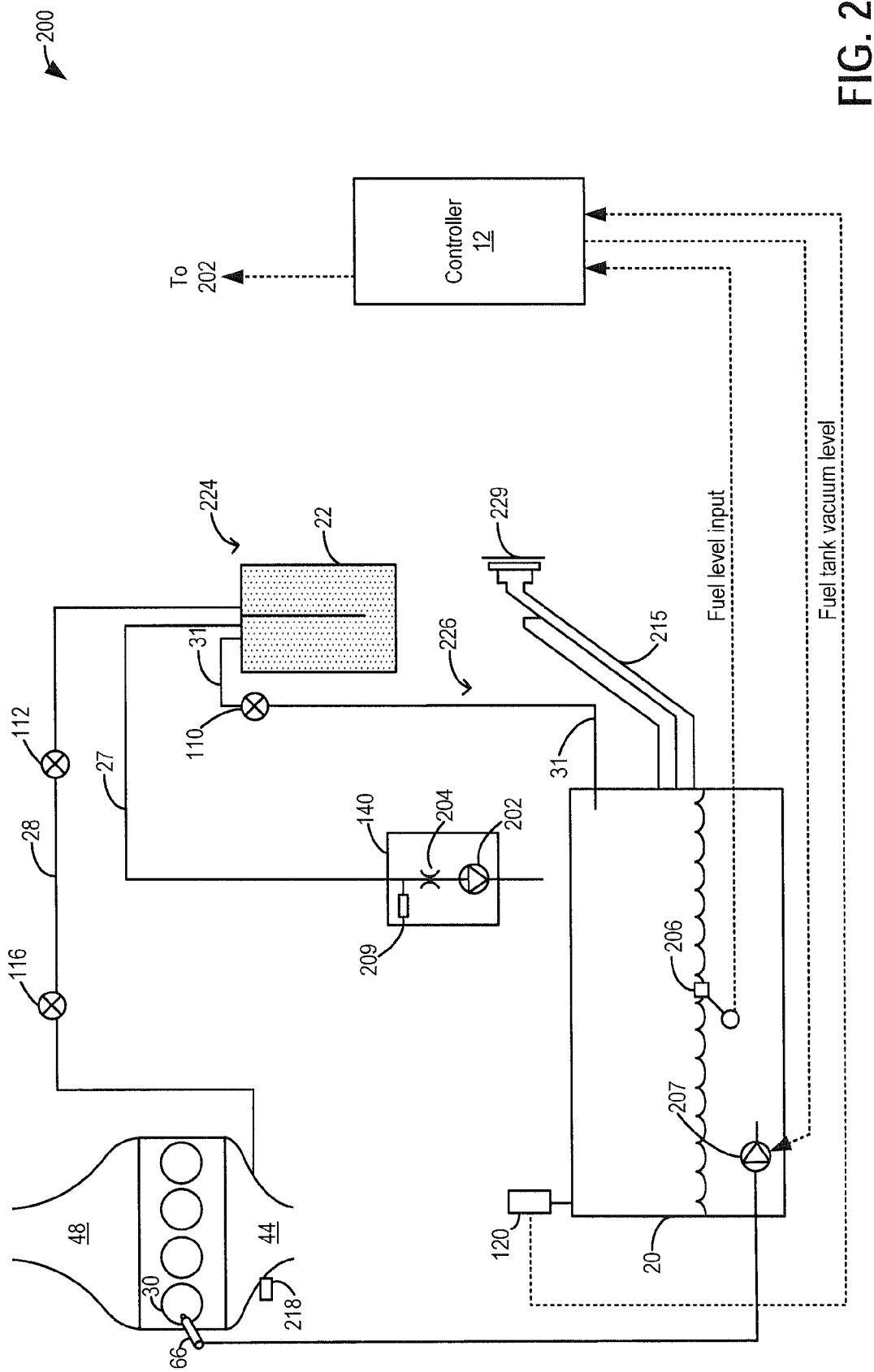
FIG. 2 shows a detailed embodiment of the fuel system of FIG. 1.
Figure 3:
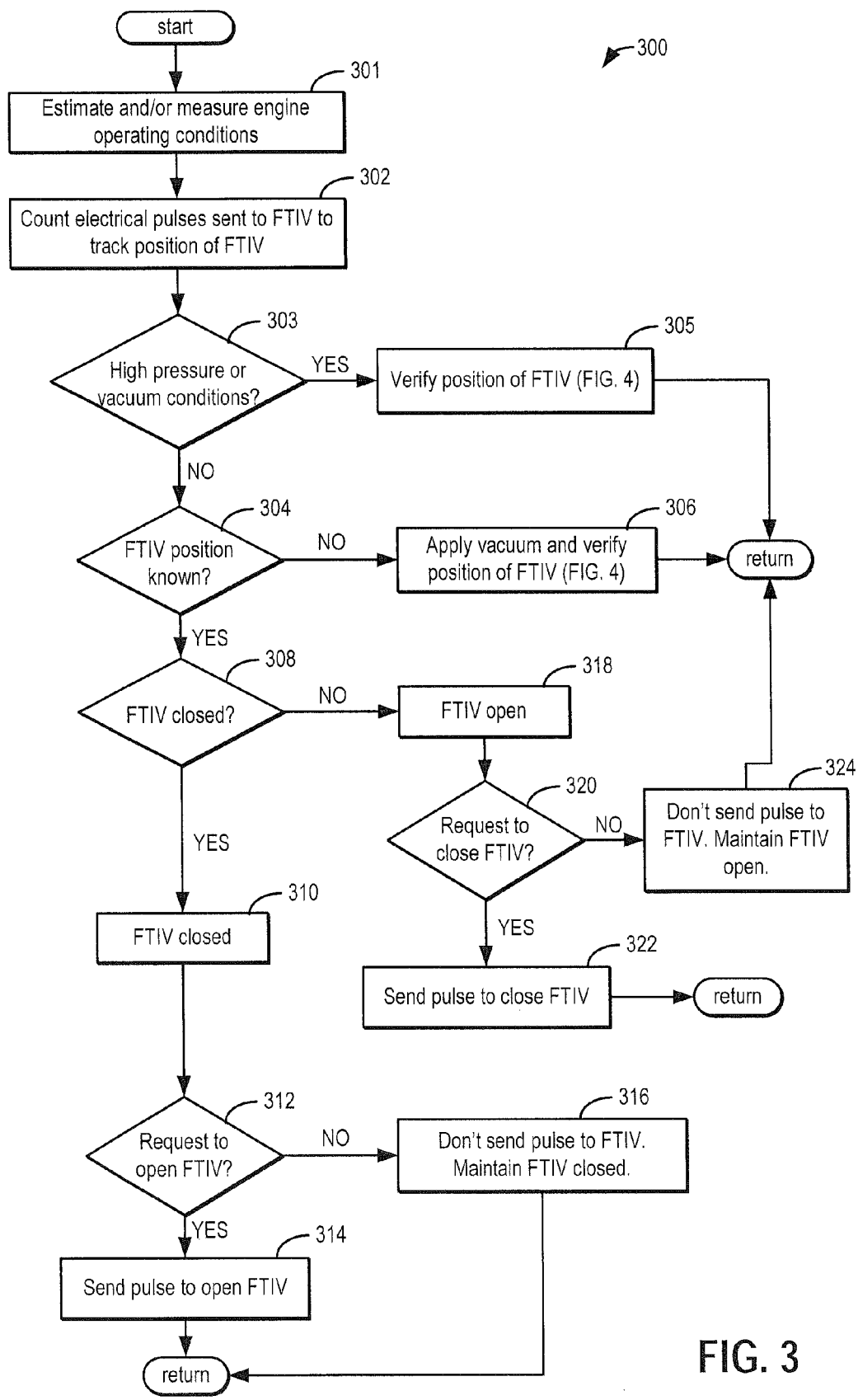
FIG. 3 shows a flow chart of a method for adjusting a fuel tank isolation valve.
Figure 4:
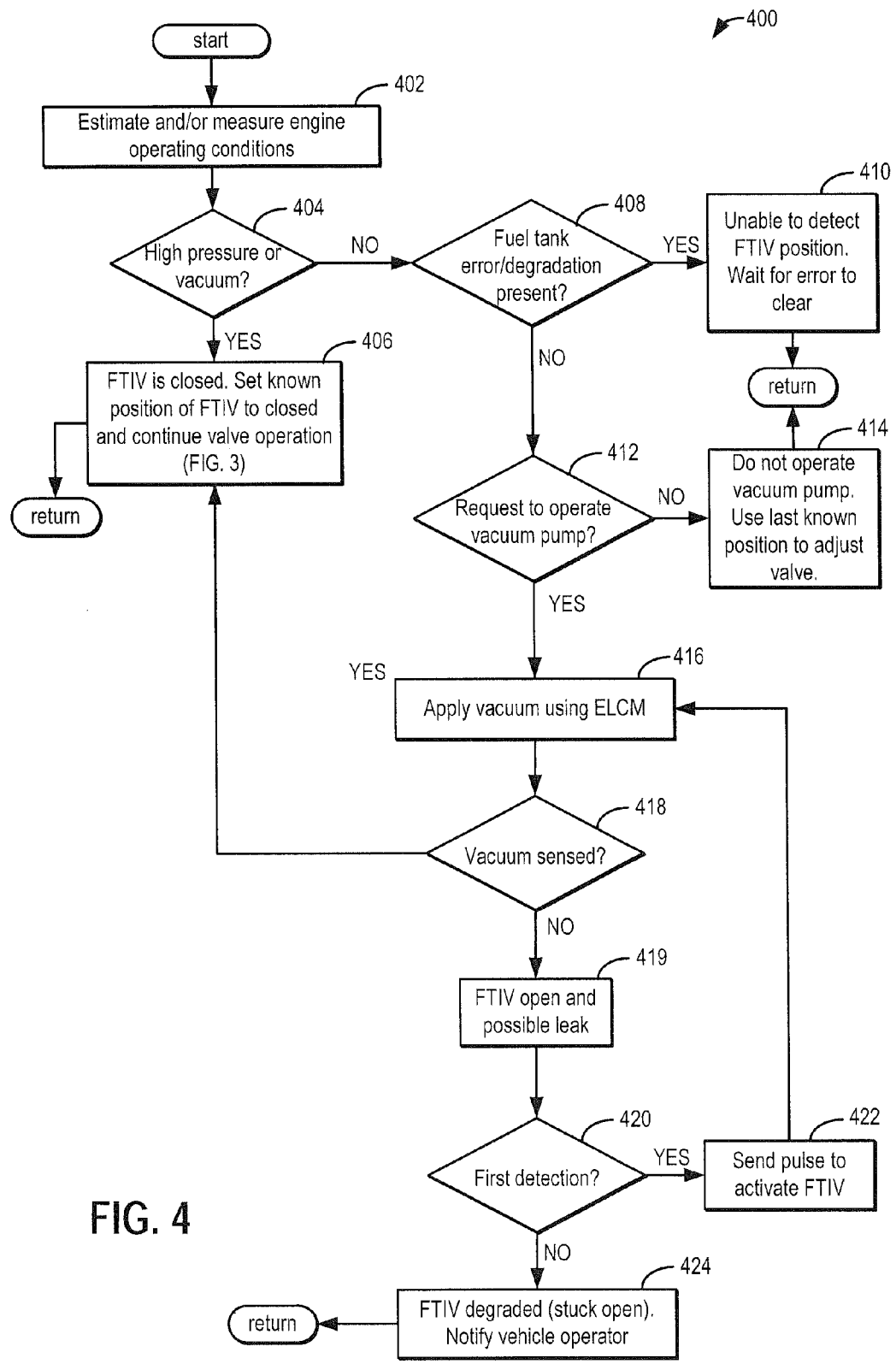
FIG. 4 shows a flow chart of a method for diagnosing a position of a fuel tank isolation valve.
Figure 5:
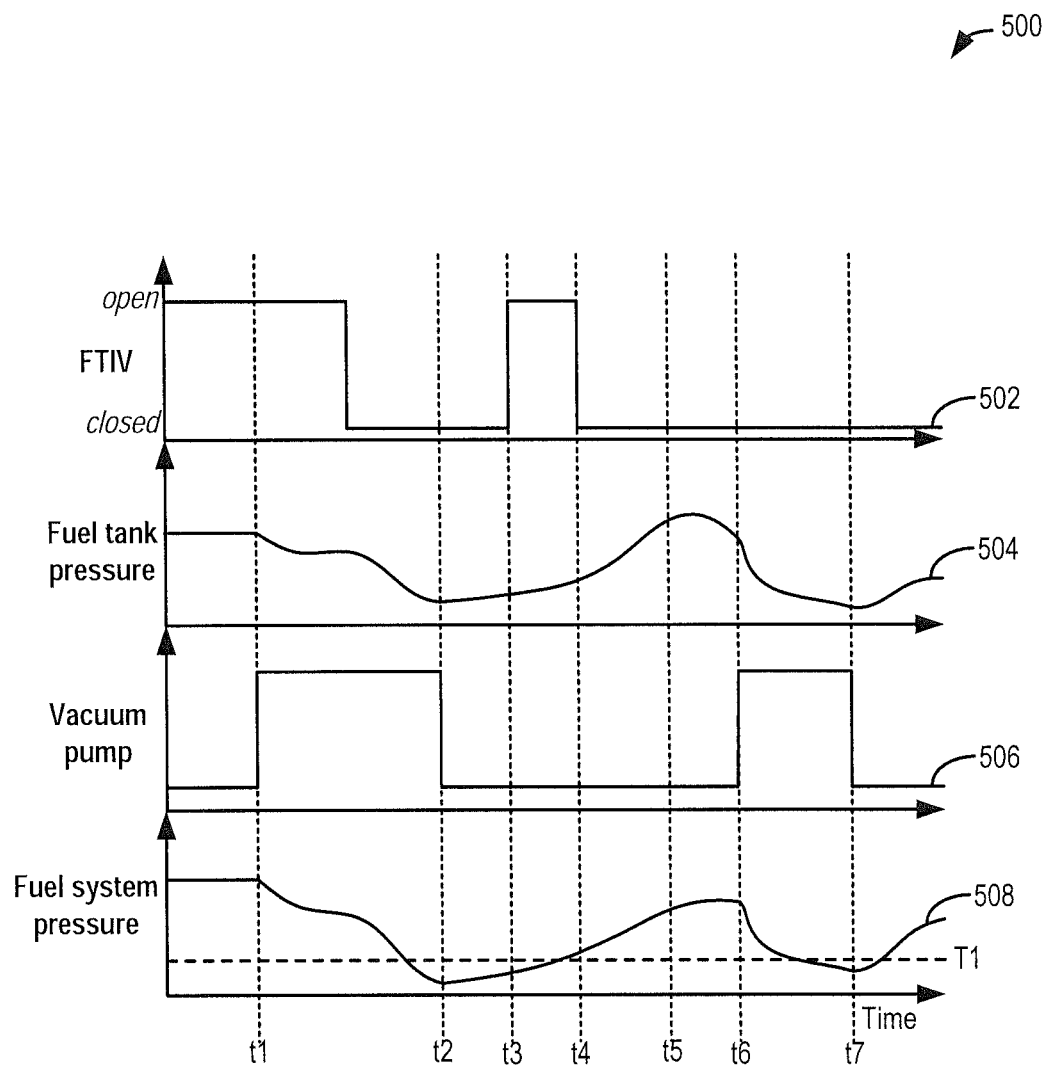
FIG. 5 shows a graphical example of adjustments to a fuel tank isolation valve.

The following description relates to systems and methods for adjusting and diagnosing a position of a fuel tank isolation valve (FTIV) of a fuel system, such as the fuel system shown in FIGS. 1-2. The FTIV may be positioned between a fuel tank and a fuel canister of the fuel system. Additionally, the FTIV may be a bi-stable valve actuated between open and closed positions via a short electrical pulse sent by a controller. A method for adjusting the FTIV into the open or closed position, based on the current or known valve position, is shown at FIG. 3. In some cases, the current position of the FTIV may not be known. In response to not knowing the FTIV position, or after or period of valve operation, the controller may adjust a fuel system component and then verify the position of the FTIV. In one example, a vacuum pump may be operated to create a vacuum in the fuel system. If the vacuum is successfully created, the FTIV may be verified as closed. However, if the vacuum is not successfully created, the FTIV may be verified as open. Subsequent valve control may then be based on the verified (e.g., known) position. A method for diagnosing the position of the FTIV and applying a vacuum to the fuel system is shown at FIG. 4. In alternate embodiments, additional or alternative fuel system components, such as a different pump, may be adjusted to create a vacuum in the fuel system or increase fuel tank pressure above a threshold pressure. Example adjustments to a FTIV based on engine operating conditions and operation of a vacuum pump are shown at FIG. 5.

FIG. 1 shows a schematic depiction of a hybrid vehicle system 6 that can derive propulsion power from engine system 8 and/or an on-board energy storage device, such as a battery system 52. An energy conversion device, such as a motor/generator 50, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated at FIG. 2.

In some embodiments, engine intake 23 may further include a boosting device, such as a compressor 74. Compressor 74 may be configured to draw in intake air at atmospheric air pressure and boost it to a higher pressure. As such, the boosting device may be a compressor of a turbocharger, where the boosted air is introduced pre-throttle, or the compressor of a supercharger, where the throttle is positioned before the boosting device. Using the boosted intake air, a boosted engine operation may be performed.

Engine system 8 may be coupled to a fuel system 18. Fuel system 18 may include a fuel tank 20 coupled to a fuel pump system 21 and one or more (one depicted in the present example) fuel vapor canisters 22. Fuel tank 20 may hold a plurality of fuel blends, including fuel with a range of alcohol concentrations, such as various gasoline-ethanol blends, including E10, E85, gasoline, etc., and combinations thereof. Fuel pump system 21 may include one or more pumps for pressurizing fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, described further below, via conduit 31, before being purged to the engine intake 23.

Fuel vapor canisters 22 may be filled with an appropriate adsorbent, for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister (e.g., fuel vapor recovery system) 22 may be purged to engine intake 23 via purge line 28 by opening canister purge valve 112.

Canister 22 may be further coupled to a vent 27 which may route gases out of the canister 22 to the atmosphere when storing, or trapping, fuel vapors from fuel tank 20. Vent 27 may also allow fresh air to be drawn into canister 22 when purging stored fuel vapors to engine intake 23 via purge line 28 and purge valve 112. In some examples, a canister check valve 116 may be optionally included in purge line 28 to prevent (boosted) intake manifold pressure from flowing gases into the purge line in the reverse direction. While this example shows vent 27 communicating with fresh, unheated air, various modifications may also be used. A detailed configuration of fuel system 18 is described at FIG. 2, including various additional components that may be included in the intake and exhaust.

As such, hybrid vehicle system 6 may have reduced engine operation times due to the vehicle being powered by engine system 8 during some conditions, and by energy storage device 52 or motor 50 under other conditions. While the reduced engine operation times reduce overall carbon emissions from the vehicle, they may also lead to insufficient purging of fuel vapors from the vehicle's emission control system. To address this, fuel tank 20 may be designed to withstand high fuel tank pressures. For example, fuel tank 20 may be constructed of material that is able to structurally withstand high fuel tank pressures (such as fuel tank pressures that are higher than a threshold and below atmospheric pressure).

Additionally, a fuel tank isolation valve (FTIV) 110 may be included in conduit 31 such that fuel tank 20 is coupled to the canister of fuel vapor recovery system 22 via the valve. Isolation valve 110 may be a bi-stable solenoid valve wherein operation of the valve may be regulated by adjusting a driving signal to (or pulse width of) the dedicated solenoid (not shown). Specifically, short electrical pulses may be sent to the isolation valve 110 to actuate the valve and switch a position of the valve (e.g., from open to closed or from closed to open). Bi-stable means that the isolation valve 110 may not a have a base position in which the valve is normally open or closed. For example, the bi-stable isolation valve 110 may require two signals to operate: one to open the valve and one to close the valve. If system power is lost or the valve becomes degraded, it may not switch back to a known position. Thus, there may not be a way of detecting the position of the isolation valve 110 without an additional sensor.

In some cases, the isolation valve 110 may be kept closed to limit the amount of fuel vapors absorbed in the canister from the fuel tank 20. The closed isolation valve 110 thereby separates storage of refueling vapors from the storage of diurnal vapors. The isolation valve 110 is opened during refueling to allow refueling vapors to be directed to the canister. As another example, the closed isolation valve 110 may be opened during selected purging conditions, such as when the fuel tank pressure is higher than a threshold (e.g., a mechanical pressure limit of the fuel tank above which the fuel tank and other fuel system components may incur mechanical damage), to release fuel vapors into the canister and maintain the fuel tank pressure below pressure limits. The isolation valve 110 may also be closed during leak detection routines to isolate the fuel tank from the engine intake.

One or more pressure sensors (FIG. 2) may be coupled to the fuel tank, upstream and/or downstream of isolation valve 110, to estimate a fuel tank pressure, or fuel tank vacuum level. One or more oxygen sensors (FIG. 2) may be coupled to the canister (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Leak detection routines may be intermittently performed on fuel system 18 to confirm that the fuel system is not degraded and/or diagnose a position of the isolation valve 110. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 140 communicatively coupled to controller 12. ELCM 140 may be coupled in vent 27, between canister 22 and the atmosphere. As elaborated at FIG. 2, ELCM 140 may include a vacuum pump for applying negative pressure to the fuel system when administering a leak test. ELCM may further include a reference orifice and a pressure sensor. Following the applying of vacuum to the fuel system, a change in pressure at the reference orifice (e.g., an absolute change or a rate of change) may be monitored and compared to a threshold. Based on the comparison, a fuel system leak may be diagnosed. In some embodiments one or more valves may be positioned in vent 27 and/or purge line 28. The controller 12 may adjust the one or more valves during leak detection routines.

As described herein, the leak tests performed may be vacuum-based or negative pressure leak tests. During the negative pressure leak test, canister purge valve 112 and canister vent valve 114 may be kept closed to isolate the fuel system. Vacuum may be applied to the fuel tank or canister side of the fuel system until a threshold vacuum level has been reached. Based on a rate of pressure bleed-up (to atmospheric pressure) and a final stabilized fuel system pressure, the presence of a fuel system leak may be determined. For example, in response to a bleed-up rate that is faster than a threshold rate, a leak may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6, as discussed in more detail in FIG. 2. As another example, the actuators may include fuel injector 66, isolation valve 110, purge valve 112, throttle 62, and the vacuum pump of ELCM 140. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 3-4.

FIG. 2 shows an example embodiment 200 of fuel system 18. As such, vehicle system components previously introduced at FIG. 1 are numbered similarly at FIG. 2 and not reintroduced. Turning to example embodiment 200 of FIG. 2, canister 22 may receive fuel vapors from fuel tank 20 through conduit 31. During regular engine operation, isolation valve 110 may be kept closed to limit the amount of diurnal vapors directed to canister 22 from fuel tank 20. During refueling operations, and selected purging conditions, isolation valve 110 may be temporarily opened, e.g., for a duration, to direct fuel vapors from the fuel tank to canister 22. While the depicted example shows isolation valve 110 positioned along conduit 31, in alternate embodiments, the isolation valve may be mounted on fuel tank 20.

One or more pressure sensors may be coupled to fuel tank 20 for estimating a fuel tank pressure or vacuum level. While the depicted example shows pressure sensor 120 coupled to fuel tank 20, in alternate embodiments, the pressure sensor may be coupled between the fuel tank and isolation valve 110. In still other embodiments, a first pressure sensor may be positioned upstream of the isolation valve, while a second pressure sensor is positioned downstream of the isolation valve, to provide an estimate of a pressure difference across the valve.

A fuel level sensor 206 located in fuel tank 20 may provide an indication of the fuel level ("Fuel Level Input") to controller 12. As depicted, fuel level sensor 206 may comprise a float connected to a variable resistor. Alternatively, other types of fuel level sensors may be used. Fuel tank 20 may further include a fuel pump 207 for pumping fuel to injector 66.

Fuel tank 20 receives fuel via a refueling line 215, which acts as a passageway between the fuel tank 20 and a refueling door 229 on an outer body of the vehicle. During a fuel tank refueling event, fuel may be pumped into the vehicle from an external source through the refueling door. During a refueling event, isolation valve 110 may be opened to allow refueling vapors to be directed to, and stored in, canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake.

An optional canister check valve 116 may be included in purge line 28 to prevent intake manifold pressure from flowing gases in the opposite direction of the purge flow. As such, the check valve 116 may be necessary if the canister purge valve control is not accurately timed or the canister purge valve itself can be forced open by a high intake manifold pressure. An estimate of the manifold absolute pressure (MAP) may be obtained from MAP sensor 218 coupled to intake manifold 44, and communicated with controller 12. Alternatively, MAP may be inferred from alternate engine operating conditions, such as mass air flow (MAF), as measured by a MAF sensor (not shown) coupled to the intake manifold. The check valve may be positioned between the canister purge valve and the intake manifold, or may be positioned before the purge valve.

Canister 22 may communicate with the atmosphere through vent 27. An evaporative leak check module 140 configured for detecting leaks in fuel system 200 may be located in vent 27. In particular, ELCM 140 is coupled in vent 27, between canister 22 and the atmosphere. ELCM 140 includes a vacuum pump 202. Vacuum pump 202 may be an electrically-operated vacuum pump driven by an on-board energy storage device (such as battery 52 of FIG. 1). Vacuum drawn by the pump may be delivered to the fuel system via a reference orifice 204. In one example, the reference orifice has a size of 0.017". ELCM 140 further includes a pressure sensor 209 for monitoring a change in fuel system pressure upon applying a vacuum during leak detection routines. It will be appreciated, however, that during leak detection, fuel system pressure may additionally or alternatively be estimated by a fuel system pressure sensor coupled in conduit 31. This may include, for example, a pressure sensor coupled to fuel tank 20, a pressure sensor coupled between fuel tank 20 and isolation valve 110, a pressure sensor coupled to canister 22, or a pressure sensor coupled between canister 22 and isolation valve 110.

During leak detection routines, the vacuum pump 202 may be operated to apply vacuum to the fuel system. Once a threshold vacuum level is reached, vacuum pump operation may be discontinued and a change in fuel system pressure may be monitored at the reference orifice 204. For example, a change in pressure may be monitored by pressure sensor 209. Based on the change in pressure relative to a threshold, fuel system leaks may be determined. When a vacuum is being applied by the vacuum pump 202, the isolation valve 110 may be closed (e.g., forced closed by the vacuum). As such, during leak detection routines, the controller may determine the isolation valve 110 is in a known closed position. In some examples, if a leak is detected, the isolation valve 110 may be stuck open. As a result, the controller may indicate that the isolation valve 110 is degraded.

In other embodiments, the controller 12 may operate the vacuum pump 202 to apply vacuum to the fuel system and verify the position of the isolation valve 110. For example, the controller may operate the vacuum pump 202 and verify the position of the isolation valve 110 based on whether the vacuum pressure is sensed (e.g., actually created) within the fuel system. If the vacuum is sensed (e.g., the fuel system pressure decreases below a vacuum threshold pressure), the controller 12 may verify that the isolation valve 110 is closed. However, if the vacuum is not sensed (e.g., not created) during operating the vacuum pump 202, the controller 12 may determine that the isolation valve 110 is open. Further details on a method for verifying the position of the isolation valve 110 is presented at FIG. 4.

The system of FIGS. 1-2 provides for a fuel system comprising an engine, a fuel tank, a canister for storing fuel vapors, a fuel tank isolation valve (FTIV) coupled in a vapor line between the fuel tank and the canister, the FTIV held in both opened and closed positions without any applied current, and a leak check module including a reference orifice, a vacuum pump, and a pressure sensor. The fuel system further includes a controller with computer readable instructions for diagnosing a position of the FTIV based on fuel system pressure and subsequently adjusting the FTIV based on the diagnosed position and engine operating conditions.

In one example, diagnosing the position of the FTIV includes setting a known position of the FTIV as a closed position when one or more of a pressure of the fuel tank increases above a threshold pressure or decreases below a vacuum threshold pressure. The computer readable instructions further include instructions for adjusting the vacuum pump to apply a vacuum to the fuel system in response to a request to operate the vacuum pump. For example, the request to perform a leak test is generated in response to one or more of a first amount of time passing since diagnosing the position of the FTIV, a second amount of time passing since performing a leak test, or a fuel system event resulting in uncertainty of the FTIV position.

As described above, the isolation valve (FTIV) may be a bi-stable valve actuated open and closed via an electrical pulse. Without an additional sensor, the position of the isolation valve may not be known or verified. Thus, if the isolation valve is degraded or in an incorrect position, there may be no means of discovering the incorrect position. As a result, the isolation valve may not function properly to reduce the amount of fuel vapors absorbed in the canister from the fuel tank.

When a vacuum is sensed in the fuel system, or when a fuel tank pressure increases above a threshold pressure, the isolation valve may be verified as closed. If the isolation valve were open, vacuum or high pressure in the fuel tank may not be possible. In some cases vacuum or increased fuel tank pressure may be created in order to diagnose the position of the isolation valve.

In one example, the vacuum pump of the evaporative leak check module (ELCM) (e.g., ELCM 140 shown in FIGS. 1-2) may apply a vacuum to the fuel system in response to a request to determine the position of the isolation valve and/or a request to perform a leak testing routine. If the fuel system pressure decreases below a vacuum threshold pressure (e.g., a pressure at which vacuum is created) during applying the vacuum, the controller may verify that the isolation valve is closed. Conversely, if the fuel system pressure does not decrease below the vacuum threshold pressure during applying the vacuum, the controller may verify that the isolation valve is closed. Then, following the isolation valve position verification, the isolation valve may be actuated as needed to open or close the valve. If the controller receives a request to close the isolation valve and the valve is already closed, then the controller may not send a signal to the isolation valve to actuate the valve. Instead, the controller does not send an actuation signal to the isolation valve and the isolation valve remains in the closed position. The controller may then track the position of the isolation valve as actuation signals are sent to the isolation valve.

In another example, the vacuum pump may be used alone to apply vacuum to the fuel system (e.g., without running a full leak testing routine). In this way, the vacuum pump may be operated for a duration, the duration based on an amount of time required to reach a vacuum pressure threshold which allows for measuring the fuel system and/or fuel tank pressure and verifying the position of the isolation valve. In yet other examples, additional or alternative pumps or system components may create a vacuum or increased fuel tank pressure that may be used for isolation valve position verification (e.g., diagnosis). For example, increasing or decreasing temperature may cause the fuel tank pressure to increase or decrease if the fuel system is closed (e.g., the FTIV is close). Thus, during creation of the vacuum with the system components, the controller may diagnose the position of the isolation valve.

In this way, an engine method comprises adjusting a fuel tank isolation valve (FTIV) of a fuel system by sending electrical pulses to the FTIV, counting each of the electrical pulses to track a position of the FTIV, and verifying the position of the FTIV when a vacuum is created in the fuel system. In one example, verifying the position of the FTIV includes verifying that the FTIV is closed when a vacuum is sensed in the fuel system. In another example, the method may further comprise verifying the FTIV is closed in response to a fuel tank pressure greater than a threshold pressure.

The method further comprises applying a vacuum to the fuel system in response to one or more of the position of the FTIV being unknown, a duration since a last FTIV position diagnosis, or a request to run a leak detection routine. In one example, applying a vacuum to the fuel system includes operating a vacuum pump coupled to a vent of a canister of the fuel system. Further, verifying the position of the FTIV includes verifying that the FTIV is open responsive to an expected position of the FTIV being an open position and no vacuum being sensed after applying the vacuum. Additionally, the method comprises sending an electrical pulse to actuate the FTIV in response to verifying that the FTIV is open when the expected position of the FTIV is a closed position. The method may then comprise reapplying the vacuum to the fuel system after sending the electrical pulse and indicating degradation of the FTIV if no vacuum is sensed after reapplying the vacuum. For example, a diagnostic code may be set based on the indication of degradation, such code stored in non-transitory memory and readable by an external controller, the code identifying degradation of the FTIV specifically. Further, as described herein, default action may be taken, via the control system of the vehicle, in response to the indication of degradation, including closing one or more valves and generating an indication to the operator that a diagnostic code has been set, such as via an indicator light, a message on the vehicle message center, etc.

Adjusting the FTIV includes sending one of the electrical pulses to actuate the FTIV from a first position to a desired position. In one example, the method includes not sending the one of the electrical pulses to actuate the FTIV when the FTIV is already in the desired position. Additionally, the FTIV may be a bi-stable valve coupled between a fuel tank and a canister of the fuel system.

Turning now to FIG. 3, a method 300 is shown for adjusting a fuel tank isolation valve (FTIV), such as FTIV 110 shown in FIGS. 1-2. As discussed above, the FTIV may be a bi-stable valve actuated between an open and a closed position by short electrical pulses sent from the controller. With each actuation, the FTIV switches from the closed to the open position or from the open to the closed position. Instructions for executing method 300 may be stored on a memory of a controller (such as controller 12 shown in FIGS. 1-2) and executed by the controller.

Method 300 begins at 301 by estimating and/or measuring engine operating conditions. Engine operating conditions may include engine speed and load, fuel tank pressure, fuel system pressure, engine temperatures and pressures, etc. At 302, the method includes counting the electrical pulses sent to the FTIV to track a position of the FTIV. As described above, one electrical pulse sent to the FTIV may change the position of the FTIV. If the controller knows a starting position of the FTIV (e.g., after verifying the position of the FTIV as shown at FIG. 4), the controller may count each subsequent pulse and update the known (or current) position of the valve in the memory of the controller. Said another way, the controller may count and track a number of actuations of the FTIV to track the current position of the FTIV.

At 303, the method includes determining if a fuel tank pressure is greater than a threshold pressure or if a fuel system pressure (or fuel tank pressure) is less than a vacuum threshold pressure. For example, the vacuum threshold pressure may indicate that a vacuum is being applied to the fuel system. If either of the pressure conditions at 303 is met, the method continues to 305 to verify the position of the FTIV, as shown at FIG. 4 (described further below). In one example, if vacuum conditions exist in the fuel system or fuel tank pressure is above a threshold pressure, the FTIV may be confirmed as closed. The threshold pressure may be a fuel tank pressure only attainable if the FTIV is closed.

If neither of the pressure conditions at 303 ate satisfied, the method continues on to 304. At 304, the method includes determining if the position of the FTIV (e.g., open or closed) is known. In one example, during running a leak test routine and/or applying a vacuum to the fuel system, the controller may verify the position of the FTIV (as shown at FIG. 4). As a result, the position of the FTIV may be known after conditions of vacuum or high fuel tank pressure in the fuel system. Further, as discussed at 302, the controller may track actuation of the FTIV and track the position of the FTIV from the known (e.g., verified) position. However, during valve operation, the controller may lose track of the position of the FTIV or an error may occur in the fuel system causing the FTIV position to be unknown.

If the FTIV position is not known by the control system (e.g., the FTIV is in an unknown position), the method continues on to 306 to adjust a fuel system component and apply a vacuum to the fuel system. As a result, the position of the FTIV may be verified based on the resulting fuel system pressures. A method for verifying the position of the FTIV is shown at FIG. 4, discussed further below.

Alternatively at 304, if the FTIV position is known, the method continues on to 308 to determine if the known position is the closed position. If the known position is the closed position, the controller determines the FTIV is closed at 310. At 312, the method includes determining if there is a request to open the FTIV. If there is a request to open the FTIV, the controller sends an electrical pulse to the FTIV to actuate the FTIV from the closed position to the open position. As such, the electrical pulse causes the FTIV to switch from the closed position to the open position. In one example, a request to open the FTIV may be generated in response to a refueling event (e.g., during refueling of the fuel tank via refueling line 215 shown in FIG. 2). In another example, a request to open the FTIV may be generated in response to purging conditions when a fuel tank pressure increases above a threshold pressure.

Alternatively at 312, if there is not a request to open the FTIV, the controller does not send a pulse to the FTIV and maintains the FTIV in the closed position at 316. In one example, the controller may receive a request to close the FTIV. However, since the FTIV is already closed, the controller does not send the electrical pulse to the valve (since this would result in opening of the valve). Further, if there is not request to open or close the FTIV, the controller maintains the FTIV closed at 316 by not sending a pulse to actuate the valve.

Returning to 308, if the FTIV is not in the closed position, the method determines the valve is open at 318. At 320, the method includes determining if there is a request to close the FTIV. In one example, a request to close the FTIV may be generated in response to execution of a leak detection routine. In another example, a request to close the FTIV may be generated following a refueling event or purging event. If there is a request to close the FTIV, the controller sends an electrical pulse to the FTIV to actuate the FTIV from the open position to the closed position. However, if there is not a request to close the FTIV, the controller does not send an electrical pulse to the FTIV, thereby maintaining the FTIV open at 324. In one example, if the controller receives a request to open the FTIV, the controller does not send an electrical pulse to actuate the FTIV (since this would result in closing of the FTIV). In another example, if the controller does not receive a request to open or close the FTIV, the controller maintains the FTIV open by not sending an electrical pulse to actuate the FTIV.

In some embodiments, upon sending a pulse to actuate (e.g., activate) the FTIV open at 314 or closed at 322, the controller may update the known position to open or closed, respectively. In this way, the controller may continuously update the known position of the FTIV within a memory of the controller during FTIV operation.

FIG. 4 shows a method 400 for diagnosing a position of the FTIV. Specifically, method 400 shows determining if the FTIV is in a closed or open position based on fuel tank pressure and/or vacuum. In one example, vacuum may be created in the fuel system with a vacuum pump. A measured fuel system pressure during applying the vacuum may verify a position of the FTIV and/or determine whether the FTIV is degraded.

The method begins at 402 by estimating and/or measuring engine operating conditions. Engine operating conditions may include engine speed and load, engine temperatures, fuel tank pressure, fuel system pressure, changes in fuel system pressure, a position of the FTIV, etc. At 404, the method includes determining if a fuel tank pressure is greater than a threshold pressure and/or if a fuel system pressure is less than a vacuum threshold pressure. For example, the vacuum threshold pressure may indicate that a vacuum is being applied to the fuel system. If either of the pressure conditions at 404 is met, the method continues on to 406 to determine that the FTIV is closed and set the known position of the FTIV as the closed position. Regular FTIV operation may continue, as shown at FIG. 3. When a vacuum is applied to the fuel system, the resulting vacuum pressure may only be attainable if the FTIV is closed. Otherwise, if the FTIV is open, the measured fuel system pressure may not be less than the vacuum threshold pressure. As such, during vacuum or high fuel tank pressure conditions, the controller may determine that the FTIV is in the closed position. This known position may then be used to adjust the FTIV into requested (e.g., desired) positions, as shown at FIG. 3.

However, if there is not a vacuum applied to the fuel system or a high fuel tank pressure, the method continues on to 408 to determine whether fuel tank degradation is present. For example, if a component of the fuel tank is degraded, a diagnostic code may be generated by the controller. If an error or diagnostic code is present, the controller may be unable to detect and diagnose the FTIV position. As a result, the method waits for the error or code to clear (e.g., resolve) and returns at 410. However, if no codes or degradation of the fuel tank is present, the method continues on to 412 to determine if there is a request to operate the vacuum pump. In alternate embodiments, the method at 412 may include determining if there is a request to apply a vacuum to the fuel system by another means (e.g., with an alternate pump or fuel system component) or if there is a request to increase the fuel tank pressure above the threshold pressure using a fuel system component (such as a pump or valve).

Entry conditions for vacuum pump operation may include a variety of engine and/or fuel system operating conditions and parameters. In one example, entry conditions for vacuum pump operation may include an amount of time since a prior leak testing routine. For example, leak testing may be performed on a set schedule, e.g. leak detection may be performed after a vehicle has traveled a certain amount of miles since a previous leak test or after a certain duration has passed since a previous leak test. As discussed above, running the leak testing routine includes operating the vacuum pump. In another example, entry conditions for vacuum pump operation may include an amount of time since diagnosing the position of the FTIV. Alternatively or additionally, vacuum pump operation may be performed after a fuel system or engine event occurs resulting in uncertainty of the FTIV position. In yet another example, vacuum pump operation may occur when turning the vehicle on or off, or after an event where the FTIV is commanded into the closed position if position verification is requested. As a result, the controller may not know whether the FTIV is open or closed.

If there is not a request to operation the vacuum pump, the method continues on to 414 to not operate the vacuum pump and instead use the last known position of the FTIV to adjust the FTIV, as shown at FIG. 3. However, if there is a request to operate the vacuum pump (or run a leak test), the method continues on to 416 to apply a vacuum to the fuel system. As described above, applying the vacuum to the fuel system may include operating the vacuum pump of an evaporative leak check module (ELCM) positioned in the fuel system (such as ELCM 140 shown in FIGS. 1-2). The method at 416 may include operating the vacuum pump (or alternate fuel system component) for a duration. The duration may be based on an amount of time needed for the fuel system pressure to decrease below the vacuum threshold pressure and allow the controller to verify that the FTIV is closed. At 418, the method includes determining if the vacuum pressure is sensed. In one example, a pressure sensor in the fuel system may sense the fuel system pressure. If the vacuum pressure is detected, the FTIV may be closed. As a result, the controller may set the know position of the FTIV to closed at 406. However, if the vacuum is not detected (e.g., the fuel system pressure does not decrease to or below the vacuum threshold pressure), the method continues on to 419 to determine that the FTIV is open. In some embodiments, method 300 may end at 419 and then continue FTIV operation.

However, in alternate embodiments, as shown in FIG. 4, the method continues on to determine if the FTIV is stuck open and degraded. For example, if the expected position of the FTIV is the closed position (as determined based on valve position tracking), the method may continue to 420 to determine if the FTIV is degraded and/or reset the known position of the valve. At 420 to the method includes determining if the FTIV open detection is the first detection. If the detection is the first detection, the controller sends an electrical pulse to the FTIV to actuate the valve at 422. Actuating the FTIV may help to unstick the valve if it is stuck open. The method returns to 416 to apply the vacuum again. If the FTIV open detection is not the first detection (e.g., the controller has already attempted to unstick the valve via actuation), the method continues on to 424 to determine the FTIV is degraded (and possibly stuck in an open position). The method at 424 may include notifying a vehicle operator the degradation.

Method 400 includes applying a vacuum to the fuel system with an ELCM to diagnose the position of the FTIV. Specifically, applying a vacuum to the fuel system with the vacuum pump of the ELCM and then detecting the vacuum via measuring the fuel system pressure may indicate the FTIV is closed. Following the operation of the vacuum pump and verification of the FTIV position, the position of the FTIV may be known and updated in the memory of the controller and used for subsequent FTIV adjustments as required based on engine operating conditions. However, in alternate embodiments, method 400 may include adjusting alternate fuel system components to create a vacuum or high pressure in the fuel tank that may be used to verify the position of the FTIV. For example, an additional or alternative pump may be positioned within the fuel system and create increased pressure in the fuel tank.

FIG. 5 shows a graphical example of adjustments to the FTIV resulting from changes in fuel system pressures. Specifically, graph 500 shows changes in a position of the FTIV at plot 502, changes in fuel tank pressure at 504, changes in operation of a vacuum pump at plot 506, changes in fuel system pressure at plot 508. As described above, in one example, the vacuum pump may be part of an evaporative leak check module (ELCM) positioned in the fuel system. Operating the vacuum pump may create a vacuum, thereby causing a decrease in fuel system pressure and indicating that the FTIV is closed. In other embodiments, an alternative or additional fuel system component may be used to apply a vacuum to the fuel system or increase the fuel tank pressure above a threshold pressure, thereby allowing diagnosis of the FTIV position.

Prior to time t1, the FTIV may be open. At time t1, entry conditions for operating the vacuum pump may be met. As a result, the controller may operate the vacuum pump (plot 506). However, after time t1, the fuel system pressure may not decrease below the vacuum threshold pressure T1 (plot 508). As a result, the controller may indicate the FTIV is open. However, the expected position of the FTIV may be the closed position. Thus, the controller may actuate the FTIV in order to unstick or reset the valve position. In response to the actuation, the FTIV may close between time t1 and time t2. After actuating the FTIV, the controller may continue operating the vacuum pump in order to verify that the FTIV closed. In some embodiments, the controller may operate the vacuum pump at time t1 responsive to a duration passing since last determining the position of the FTIV. In another example, the vacuum pump may be turned on at time t1 in response to the FTIV position not being known.

At time t2 the vacuum pump is turned off (after verifying the FTIV is closed). At time t3, the controller may send an electrical pulse to the FTIV to open the FTIV in response to engine operating conditions (plot 502). In one example, the controller may actuate the FTIV open during a refueling event. At time t4, the controller may actuate the FTIV to close (plot 502) by sending an electrical pulse to the FTIV (e.g., in response to the conclusion of the refueling event).

At time t6, the controller may receive a request to operate the vacuum pump. As a result, the controller may activate the vacuum pump at time t6 (plot 506). As a result, the fuel system pressure decreases below the vacuum threshold pressure T1 (plot 508). Thus, the FTIV is verified as being in the closed position. The vacuum pump is turned off at time t7, after running for a duration. As described above, the duration may be long enough for the fuel system pressure to decrease below the vacuum threshold pressure T1 and verify that the FTIV is closed.

As shown in FIG. 5, a method for an engine fuel system may include tracking a position of a fuel tank isolation valve (FTIV). During a first condition (as show at times t3 and t4) when a position of the FTIV is known, the method may include adjusting the position of the FTIV based on engine operating conditions from the known position. During a second condition (as shown at time t1 and time t6) when the position of the FTIV is not known, the method may include applying a vacuum to the fuel system and verifying the position of the FTIV based on detection of the vacuum.

In one example, applying the vacuum includes operating a vacuum pump of an evaporative leak check module positioned in the fuel system. In one example, verifying the position of the FTIV includes, after applying the vacuum, verifying the FTIV is close in response to the fuel system pressure being less than the vacuum threshold pressure (as shown after time t6) and verifying the FTIV is open in response to the fuel system pressure being greater than the vacuum threshold pressure (as shown after time t1). As shown at time t3, after moving the FTIV to a closed position, the method may include sending an electrical pulse to actuate the FTIV into an open position, from the closed position, in response to a request to open the FTIV. In another example, after moving the FTIV to a closed position, the method may include not sending an electrical pulse to actuate the FTIV in response to a request to close the FTIV.

The method may include adjusting the FTIV into an open position during one or more of refueling events or during purging events wherein a fuel tank pressure increases above a threshold pressure and adjusting the FTIV into the closed position during leak detection routines. In one example, adjusting the FTIV includes sending an electrical pulse to actuate the FTIV and tracking the position of the FTIV includes counting a number of actuations of the FTIV and updating the known position after each actuation.

In this way, a position of a fuel tank isolation valve (FTIV) may be diagnosed. Specifically, the position of a bi-stable FTIV may be validated by applying a vacuum to the fuel system or increasing a fuel tank pressure over a threshold pressure. The vacuum and/or the threshold pressure may be pressures that may only be attainable when the FTIV is closed, thereby verifying the closed position of the FTIV during these pressure conditions. Thus, when a vacuum is applied to the fuel system or the fuel tank pressure increases above the threshold pressure, the FTIV position may be confirmed as closed. This known closed position may then be used by the controller for subsequent FTIV adjustments. In one example, the vacuum may be created with a vacuum pump of an evaporative leak check module (ELCM) during a leak testing routine. In this way, a technical effect is achieved by adjusting a fuel system component and verifying the FTIV position based on resulting fuel system pressures, thereby increasing the accuracy of subsequent FTIV control.

As another embodiment, applying a vacuum to the fuel system (or increasing the fuel tank pressure above the threshold pressure) may force the FTIV to close. As a result, the FTIV position may be confirmed as closed after operating the vacuum pump and/or running a leak detection routine wherein the vacuum pump is used to create a vacuum in the fuel system. For example, an engine method may include adjusting a fuel system component to move a fuel tank isolation valve (FTIV) of a fuel system to a known position. The method further comprises during subsequent engine operation, adjusting the FTIV to a desired position after it is moved to the known position. In one example, the known position is a closed position. Further, adjusting the FTIV to the desired position after it is moved to the known position may further include adjusting the FTIV based on the FTIV being in the known position and based on a request to move the FTIV to a new position, the new position being different than the known position. The method may further comprise setting the known position of the FTIV as the closed position when one or more of a fuel tank pressure increases above a threshold pressure or decreases below a vacuum threshold pressure. As one example, the FTIV is a bi-stable valve coupled between a fuel tank and a canister of the fuel system.

In one example, adjusting the FTIV to the desired position includes sending an electrical pulse to actuate the FTIV from a first position to the desired position. In another example, the method further includes not sending the electrical pulse to actuate the FTIV when the FTIV is already in the desired position. The method may further include tracking a number of actuations of the FTIV after moving the FTIV into the known position and updating the known position after each actuation.

In one example, adjusting the fuel system component includes operating a vacuum pump to apply a vacuum to the fuel system, the vacuum pump coupled to a vent of a canister of the fuel system. The method may further include turning off the vacuum pump and monitoring a change in fuel system pressure following the applying of the vacuum to the fuel system relative to a threshold. Additionally, the method may include indicating degradation of the FTIV when the change in fuel system pressure is greater than the threshold.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
via a controller:
adjusting a fuel tank isolation valve (FTIV) of a fuel system by sending electrical pulses to the FTIV;
counting each of the electrical pulses to track a position of the FTIV;
applying a vacuum to force the FTIV to a known closed position;
verifying the closed position of the FTIV in response to sensing the applied vacuum in the fuel system; and
following verification, actuating the FTIV to a desired position based on the verified position and engine operating conditions by sending further electrical pulses.

2. The method of claim 1, further comprising generating an indication of the verified position, the method further comprising taking a default action in response to the indication of the verified position.

3. The method of claim 1, further comprising verifying the FTIV is closed in response to a fuel tank pressure greater than a threshold pressure.

4. The method of claim 1, further comprising applying the vacuum to the fuel system in response to one or more of the position of the FTIV being unknown, a duration since a last FTIV position diagnosis, or a request to run a leak detection routine.

5. The method of claim 4, wherein applying the vacuum to the fuel system includes operating a vacuum pump coupled to a vent of a canister of the fuel system to apply a negative pressure to the fuel system.

6. The method of claim 4, wherein verifying the closed position of the FTIV includes verifying that the FTIV is open responsive to an expected position of the FTIV being an open position and no vacuum being sensed after applying the vacuum.

7. The method of claim 6, further comprising sending an electrical pulse to actuate the FTIV in response to verifying that the FTIV is open when the expected position of the FTIV is the closed position.

8. The method of claim 6, further comprising reapplying the vacuum to the fuel system after sending the electrical pulse and indicating degradation of the FTIV if no vacuum is sensed after reapplying the vacuum.

9. The method of claim 1, wherein adjusting the FTIV includes sending one of the electrical pulses to actuate the FTIV from a first position to the desired position.

10. The method of claim 9, further comprising not sending the one of the electrical pulses to actuate the FTIV when the FTIV is already in the desired position.

11. The method of claim 1, wherein the FTIV is a bi-stable valve coupled between a fuel tank and a canister of the fuel system and wherein verifying the closed position includes verifying the closed position of the FTIV in response to sensing fuel system pressure decreasing below a vacuum threshold pressure, where the vacuum threshold pressure is a pressure at which vacuum is created.

12. A method for an engine fuel system, comprising:
via a controller: tracking a position of a fuel tank isolation valve (FTIV); and
during a first condition when the position of the FTIV is known, adjusting the position of the FTIV based on engine operating conditions from the known position; and
during a second condition when the position of the FTIV is unknown, applying a vacuum to the engine fuel system and the FTIV to force the FTIV to a known closed position and verifying the closed position of the FTIV based on detection of the vacuum.

13. The method of claim 12, wherein applying the vacuum includes operating a vacuum pump of an evaporative leak check module positioned in the engine fuel system to create the vacuum.

14. The method of claim 12, wherein verifying the closed position of the FTIV includes, after applying the vacuum, verifying the FTIV is closed in response to an engine fuel system pressure being less than a vacuum threshold pressure and verifying the FTIV is open in response to the engine fuel system pressure being greater than the vacuum threshold pressure.

15. The method of claim 12, further comprising, after moving the FTIV to the closed position,
sending an electrical pulse to actuate the FTIV into an open position, from the closed position, in response to a request to open the FTIV; and
not sending an electrical pulse to actuate the FTIV in response to a request to close the FTIV.

16. The method of claim 12, further comprising adjusting the FTIV into an open position during one or more of refueling events or during purging events wherein a fuel tank pressure increases above a threshold pressure and adjusting the FTIV into the closed position during leak detection routines.

17. The method of claim 12, wherein adjusting the FTIV includes sending an electrical pulse to actuate the FTIV and wherein tracking the position of the FTIV includes counting a number of actuations of the FTIV and updating the known position after each actuation.

18. A fuel system, comprising:
- an engine;
- a fuel tank;
- a canister for storing fuel vapors;
- a fuel tank isolation valve (FTIV) coupled in a vapor line between the fuel tank and the canister, the FTIV held in both opened and closed positions without any applied current;
- a leak check module including a reference orifice, a vacuum pump, and a pressure sensor; and
- a controller with computer readable instructions for:
    - applying a vacuum to the fuel system via the vacuum pump to force the FTIV to a known closed position; and
    - diagnosing the closed position of the FTIV based on fuel system pressure after applying the vacuum and subsequently adjusting the FTIV based on the diagnosed position and engine operating conditions.

19. The system of claim 18, wherein diagnosing the closed position of the FTIV includes setting a known position of the FTIV as the closed position when one or more of a pressure of the fuel tank increases above a threshold pressure or decreases below a vacuum threshold pressure.

20. The system of claim 18, wherein the computer readable instructions further include instructions for adjusting the vacuum pump to apply the vacuum to the fuel system in response to a request to operate the vacuum pump and wherein the request to operate the vacuum pump is generated in response to one or more of a first amount of time passing since diagnosing the closed position of the FTIV, a second amount of time passing since performing a leak test, or a fuel system event resulting in uncertainty of the FTIV position.

* * * * *